United States Patent
Fu et al.

(10) Patent No.: US 11,875,467 B2
(45) Date of Patent: Jan. 16, 2024

(54) PROCESSING METHOD FOR COMBINING A REAL-WORLD ENVIRONMENT WITH VIRTUAL INFORMATION ACCORDING TO A VIDEO FRAME DIFFERENCE VALUE TO PROVIDE AN AUGMENTED REALITY SCENE, TERMINAL DEVICE, SYSTEM, AND COMPUTER STORAGE MEDIUM

(71) Applicant: TENCENT TECHNOLOGY (SHENZHEN) COMPANY LTD, Shenzhen (CN)

(72) Inventors: Dan Qing Fu, Guangdong (CN); Hao Xu, Guangdong (CN); Cheng Quan Liu, Guangdong (CN); Cheng Zhuo Zou, Guangdong (CN); Ting Lu, Guangdong (CN); Xiao Ming Xiang, Guangdong (CN)

(73) Assignee: TENCENT TECHNOLOGY (SHENZHEN) COMPANY LTD, Shenzhen (CN)

( * ) Notice: Subject to any disclaimer, the term of this patent is extended or adjusted under 35 U.S.C. 154(b) by 0 days.

(21) Appl. No.: 17/835,077

(22) Filed: Jun. 8, 2022

(65) Prior Publication Data
US 2022/0301300 A1  Sep. 22, 2022

Related U.S. Application Data

(63) Continuation of application No. 16/573,397, filed on Sep. 17, 2019, now Pat. No. 11,410,415, which is a
(Continued)

(30) Foreign Application Priority Data

Sep. 8, 2017 (CN) .......................... 201710804532.4

(51) Int. Cl.
*G06T 19/00* (2011.01)
*G06F 3/048* (2013.01)
(Continued)

(52) U.S. Cl.
CPC ............ *G06T 19/006* (2013.01); *G06F 3/048* (2013.01); *G06V 10/95* (2022.01); *G06V 20/10* (2022.01); *G06V 20/20* (2022.01); *G11B 27/031* (2013.01)

(58) Field of Classification Search
CPC ......... G06T 19/006; G06T 2207/10016; G06T 2207/20081; G06T 7/00; G06V 20/20;
(Continued)

(56) References Cited

U.S. PATENT DOCUMENTS 8,547,431 B2 * 10/2013 Williams .............. G06F 16/583
348/169
2010/0004926 A1 * 1/2010 Neoran ................... G10L 25/48
704/201
(Continued)

FOREIGN PATENT DOCUMENTS

CN         102663448 A      9/2012
CN         102821323 A      12/2012
(Continued)

OTHER PUBLICATIONS

International Search Report for PCT/CN2018/103589 dated Nov. 29, 2018 [PCT/ISA/210].

*Primary Examiner* — Jin Cheng Wang
(74) *Attorney, Agent, or Firm* — Sughrue Mion, PLLC

(57) ABSTRACT

A processing method that is performed by one or more processor is provided. The processing method includes determining a target video frame in a currently captured video; determining an object area in the target video frame based on a box selection model; determining a category of
(Continued)

a target object in the object area based on a classification model used to classify an object in the object area; obtaining augmented reality scene information associated with the category of the target object; and performing augmented reality processing on the object area in the target video frame and the augmented reality scene information, to obtain the augmented reality scene.

20 Claims, 9 Drawing Sheets

Related U.S. Application Data continuation of application No. PCT/CN2018/103589, filed on Aug. 31, 2018.

(51) Int. Cl.
*G11B 27/031* (2006.01)
*G06V 20/10* (2022.01)
*G06V 10/94* (2022.01)
*G06V 20/20* (2022.01)

(58) Field of Classification Search
CPC ........ G06V 20/10; G06V 10/95; G06F 3/048; G06F 3/011; G11B 27/031; G11B 27/0036
See application file for complete search history.

(56) References Cited

U.S. PATENT DOCUMENTS

| | | |
|---|---|---|
| 2012/0229629 A1 | 9/2012 | Blumstein-Koren et al. |
| 2012/0249831 A1* | 10/2012 | Porter ................. H04N 23/695 348/222.1 |
| 2015/0109337 A1* | 4/2015 | Hofmann .............. G06T 19/006 345/633 |
| 2015/0117703 A1 | 4/2015 | Peng et al. |
| 2015/0193970 A1 | 7/2015 | Liu et al. |
| 2016/0150211 A1* | 5/2016 | Hwang ................ H04N 13/246 348/43 |
| 2016/0378861 A1 | 12/2016 | Eledath et al. |
| 2017/0230581 A1* | 8/2017 | Cai .................... H04N 23/6811 |
| 2017/0255830 A1 | 9/2017 | Chen |
| 2018/0197577 A1* | 7/2018 | Farre Guiu .......... G06F 16/739 |
| 2018/0285647 A1 | 10/2018 | Chen et al. |
| 2018/0286199 A1 | 10/2018 | Chen et al. |
| 2019/0329407 A1* | 10/2019 | Qi ........................ G05D 1/0274 |
| 2020/0143205 A1* | 5/2020 | Yao ........................ G06V 10/82 |
| 2021/0120221 A1* | 4/2021 | Li ............................ G06T 7/579 |
| 2021/0141378 A1* | 5/2021 | Zhou ...................... G06T 7/246 |
| 2021/0150735 A1* | 5/2021 | Elg ........................ G06T 7/262 |

FOREIGN PATENT DOCUMENTS

| | | |
|---|---|---|
| CN | 105373938 A | 3/2016 |
| CN | 105678322 A | 6/2016 |
| CN | 107481327 A | 12/2017 |

* cited by examiner

PROCESSING METHOD FOR COMBINING A REAL-WORLD ENVIRONMENT WITH VIRTUAL INFORMATION ACCORDING TO A VIDEO FRAME DIFFERENCE VALUE TO PROVIDE AN AUGMENTED REALITY SCENE, TERMINAL DEVICE, SYSTEM, AND COMPUTER STORAGE MEDIUM

CROSS REFERENCE TO RELATED APPLICATIONS

This application is a continuation of U.S. patent application Ser. No. 16/573,397, filed with the U.S. Patent and Trademark Office on Sep. 17, 2019, now U.S. Pat. No. 11,410,415, issued Aug. 9, 2022, which is a continuation of International Patent Application No. PCT/CN2018/103589, filed Aug. 31, 2018, which claims priority from Chinese Patent Application No. 201710804532.4, filed with the China National Intellectual Property Administration (CNIPA) on Sep. 8, 2017, the disclosures of which are incorporated by reference in their entireties.

BACKGROUND

Field

Methods and apparatuses consistent with embodiments of the present application relate to augmented reality technologies, and in particular, to a processing method for an augmented reality scene, a terminal device, a system, and a computer storage medium.

Related Art

Augmented reality (AR) is an emerging technology, and can combine a real-world environment with virtual information. A location and an angle of a relevant object in an image captured by an image capturing apparatus may be calculated in real time, AR scene information, such as a corresponding virtual image and a 3D model, is further superimposed, and then, the AR scene information is superimposed on an image about the real word, thereby combining a virtual world with the real word. Interaction with a user may further be performed in the AR.

Superimposing AR scene information onto an image about the real word is a key for implementing AR. Therefore, there is a need for improved methods of superimposing AR scene information on an image captured by an image capturing apparatus.

SUMMARY

One or more embodiments provide a processing method for an augmented reality scene, a terminal device, a system, and a computer storage medium are provided.

According to an aspect of an embodiment, there is provided a processing method, performed by at least one processor, for an augmented reality scene, the processing method including: determining, by the at least one processor, a target video frame in a currently captured video; determining, by the at least one processor, an object area in the target video frame based on a box selection model; determining, by the at least one processor, a category of a target object in the object area based on a classification model used to classify an object in the object area; obtaining, by the at least one processor, augmented reality scene information associated with the category of the target object; and performing, by the at least one processor, augmented reality processing on the object area in the target video frame and the augmented reality scene information, to obtain the augmented reality scene.

According to an aspect of an embodiment, there is provided a system for implementing an augmented reality scene, the system including: at least one memory configured to store computer program code; and at least one processor configured to access the at least one memory and operate as instructed by the computer program code. The computer program code includes: target video frame determining code configured to cause the at least one processor to determine a target video frame in a currently captured video; object area determining code configured to cause the at least one processor to determine an object area in the target video frame based on a box selection model; category determining code configured to cause the at least one processor to determine, based on a classification model, a category of a target object in the object area; and augmented reality processing code configured to cause the at least one processor to obtain augmented reality scene information associated with the category of the target object and perform augmented reality processing on the object area in the target video frame based on the augmented reality scene information, to obtain the augmented reality scene.

According to an aspect of an embodiment, there is provided one or more non-transitory computer storage mediums storing computer readable instructions, the computer readable instructions, when executed by one or more processors, causing the one or more processors to: determine a target video frame in a currently captured video; determine an object area in the target video frame based on a box selection model; determine a category of a target object in the object area based on a classification model used to classify an object in the object area; obtain augmented reality scene information associated with the category of the target object; and perform augmented reality processing on the object area in the target video frame and the augmented reality scene information, to obtain an augmented reality scene.

BRIEF DESCRIPTION OF THE DRAWINGS

The above and other aspects, features and advantages will become apparent from the following detailed description taken in conjunction with the accompanying drawings in which.

DETAILED DESCRIPTION

Figure 1:
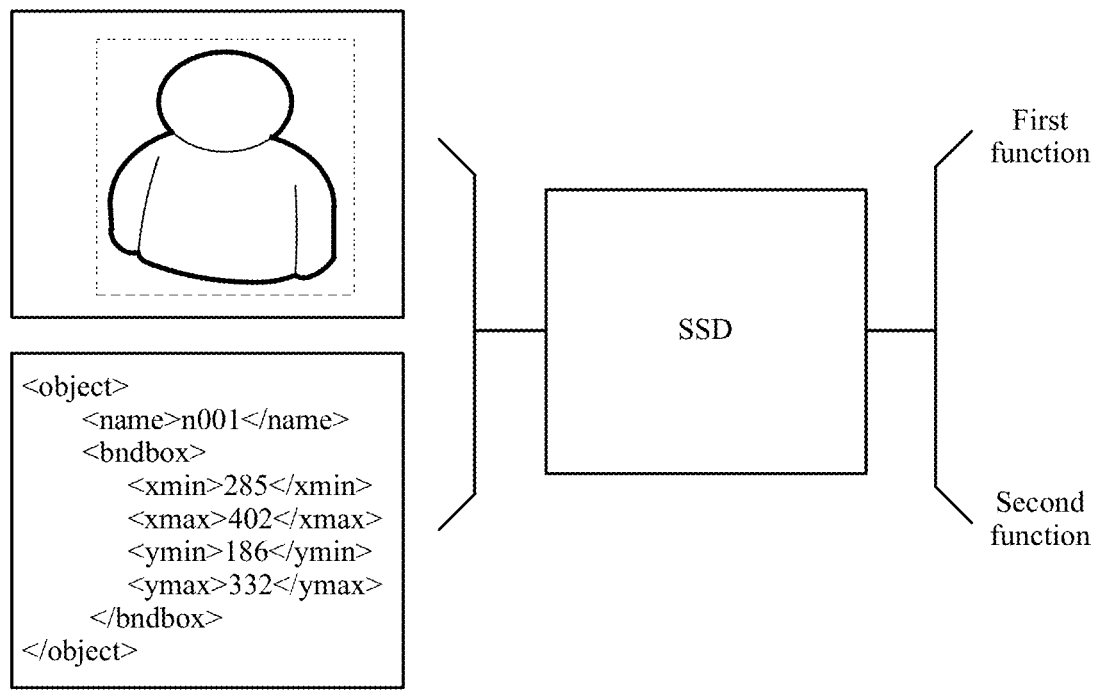
FIG. 1 is a schematic diagram of presetting a relevant model according to an embodiment.

To better convey the present disclosure, embodiments will be further described with reference to the accompanying drawings. It should be understood that the specific embodiments described herein are merely used to explain this application but are not intended to limit this application.

In a process of implementing AR, all video frames in a video captured by an image capturing apparatus may be analyzed and recognized by presetting a marker, to determine suitable AR scene information and a superimposition location. In an AR marker recognition manner, an image of a marker is saved, and then, an image area the same as the marker is recognized, by using an image recognition technology, in a video captured by an image capturing apparatus. If an image area the same as the marker is recognized, AR scene information associated with the image area is further obtained, and the AR scene information is superimposed onto a video frame subsequently captured by the image capturing apparatus.

In one embodiment, a user may upload a to-be-recognized image of a marker to a cloud backend in advance or preset it locally. For example, the image of the marker may be an image of a table, an image of an animal, or the like. When the user targets a client device that includes an image capturing apparatus, such as a camera of mobile phone, to an object corresponding to the marker for photography, the client device periodically captures video frames to upload the video frames, and the backend recognizes the video frames by using the preset image of the marker. After the recognition succeeds, an attitude matrix is calculated according to a mapping relationship between a location of a feature point in a video frame the same as the image of the marker in the video frames and a location of a corresponding feature in the image of the marker, to superimpose AR scene information on the video frame. For example, an image of a "dog" is stored in a local memory as an image of a marker. After capturing a video frame, the image capturing apparatus compares the video frame with the image of the marker, if a similarity between an image object existing in a specific image area in the video frame and the image of the "dog" in the image of the marker is higher a preset similarity threshold, it is considered that an image area corresponding to the image of the marker exists in the video frame, and AR scene information related to "dog" may be superimposed onto the area. For example, a 3D image of "dog bone" is superimposed onto the image area in the video frame. A similarity between different images may be calculated by matching local feature points of images.

According to an embodiment, a processing procedure for an augmented reality scene may further include two parts: presetting a relevant model and processing an AR scene by calling the relevant model. The relevant model includes a box selection model used to box-select an object area and a classification model used to perform classified recognition on an object. According to an embodiment, the box selection model and the classification model may belong to a same functional model. The functional model not only can be used to box-select an object area, but also can be used to perform classified recognition on an object. Based on each model, on the one hand, a partial image area may be box-selected from an image captured by the image capturing apparatus, and on the other hand, a category of a target object may be quickly recognized from the box-selected partial image area, so as to subsequently AR scene information related to the category of the object and superimpose AR scene information at a proper location. AR scene information indicates some pieces of 3D virtual information, for example, information such as 3D animals, plants, and numbers.

FIG. 1 is a schematic diagram of presetting a relevant model according to an embodiment. When a relevant model is preset, an initial model, for example, an initial Single Shot MultiBox Detector (SSD) model (a model used for object detection) used to box-select the object area and perform classified recognition on an object, is first preset. Then, the initial model is optimized by using a collected image and description information of the image as input, and the collected image is a collected image including an object of a category.

According to an embodiment, for a needed object category, a plurality of images in the object category is collected on a network. For example, if a category of "dog" needs to be classified, a large quantity of images including "dog" are collected. Approximately 2000 clear images with various backgrounds may be collected for each classified category, and the images may be used as an image set for subsequent training and learning of a model. Corpus annotation may be manually performed on the images to obtain description information of each image. In addition, the images are manually sifted, so that in a specific classified category, a corresponding object is located at approximately same location areas in the images, for example. For example in a category of "dog", "dog" is located in an area close to a center of the image. In a manual annotation process, in this embodiment of this application, an annotation tool may be provided, and the tool allows box-selecting an image area where an object that needs to be classified is located, annotation may be performed by using a rectangular box, and a classification tag is provided. The description information of the image may be a path of the image, a name of the image, upper left corner coordinates of the rectangular box, lower right corner coordinates of the rectangular box. The description information may be recorded in an Extensible Markup Language (XML) standard format into an XML file, so as to provide corpus preparation for model training. In FIG. 1, a name part is a name of the image, and a bndbox part is upper left corner coordinates of the rectangular box and lower right corner coordinates of the rectangular box.

A first function shown in FIG. 1 may be a loss function, for example, a softmax loss function. The first function may be used to measure a difference between a category of an object in a predicted image area box-selected from a predicted image and a category indicated by a classification identifier in description information of the predicted image. Specifically, each pixel value of the image may be input into a neural network, and forward calculation is performed according to a parameter learned by the neural network, to further obtain an image feature representation vector. The first function performs prediction on the image feature representation vector, to obtain a category of the object in the predicted image area. The image feature representation vector is calculated by using the first function, so that in a probability at which an object in the predicted image area belongs to a category, for example, a probability of belonging to a category such as "dog" or "cat", can be obtained, and a category with a maximum probability is a prediction result.

According to an embodiment, the aforementioned neural network used to obtain an image feature representation vector, a first function, and a second function are configured in an SSD model, and the SSD model can determine a feature of an image, and classify the image and box-select an area based on the feature. If the prediction result is the same as a category indicated by a category identifier in description information of the predicted image, the initial model may be considered to be useful, and continues to repeatedly perform the foregoing procedure, such as recognizing an object in a predicted image area, on a next predicted image. If the prediction result is different from a category indicated by a category identifier in description information of the predicted image, a modeling condition is not satisfied, and it needs to update a relevant parameter in the initial model according to the description information and the predicted image.

The second function shown in FIG. 1 may also be a loss function, and for example, may be a Smooth loss function. The second function is used to measure a difference between an image location of a box-selected predicted image area in a predicted image and target area location information in description information of the predicted image. The target area location information may indicate the upper left corner coordinates of the aforementioned rectangular box and the lower right corner coordinates of the rectangular box. After calculation of the second function, if an obtained loss value (the loss value may be considered as difference information between image location information of the predicted image area and the target area location information) is less than a preset threshold, it may be considered that a difference between the two satisfies a preset modeling condition, and the initial model may be considered to be useful, and the foregoing procedures, such as predicting an image area, are repeatedly perform on a next predicted image. If the loss value is greater than or equal to the preset threshold, the preset modeling condition is not satisfied, and it needs to update the initial model according to the predicted image and description information of the predicted image.

After the foregoing processing is performed on all images collected by using the initial model, an updated initial model is obtained. The obtained updated initial model may be used as a final model. The final model can be used to box-select an object area and perform classified recognition on an object.

After a box selection model and a classification model are obtained by performing learning and training according to a large quantity of images, box selection and classified calculation may be performed on an image captured by an image capturing apparatus for implementing an augmented reality function may be performed by using corresponding models, so as to box-select an image area and classify a target object.

To improve processing efficiency on a video frame in a video captured by the image capturing apparatus, after a stable video frame is obtained, processing, such as compression, may be further performed on the video frame, and box selection and classification processing are performed. According to an embodiment, if box selection and classification processing are performed on the server device, the client device needs to provide a captured stable video frame to the server device, and the client device may perform processing, such as tailoring and compression, on the stable video frame before sending the stable video frame, so as to reduce consumption of network traffic and improve transmission efficiency.

Figure 2:
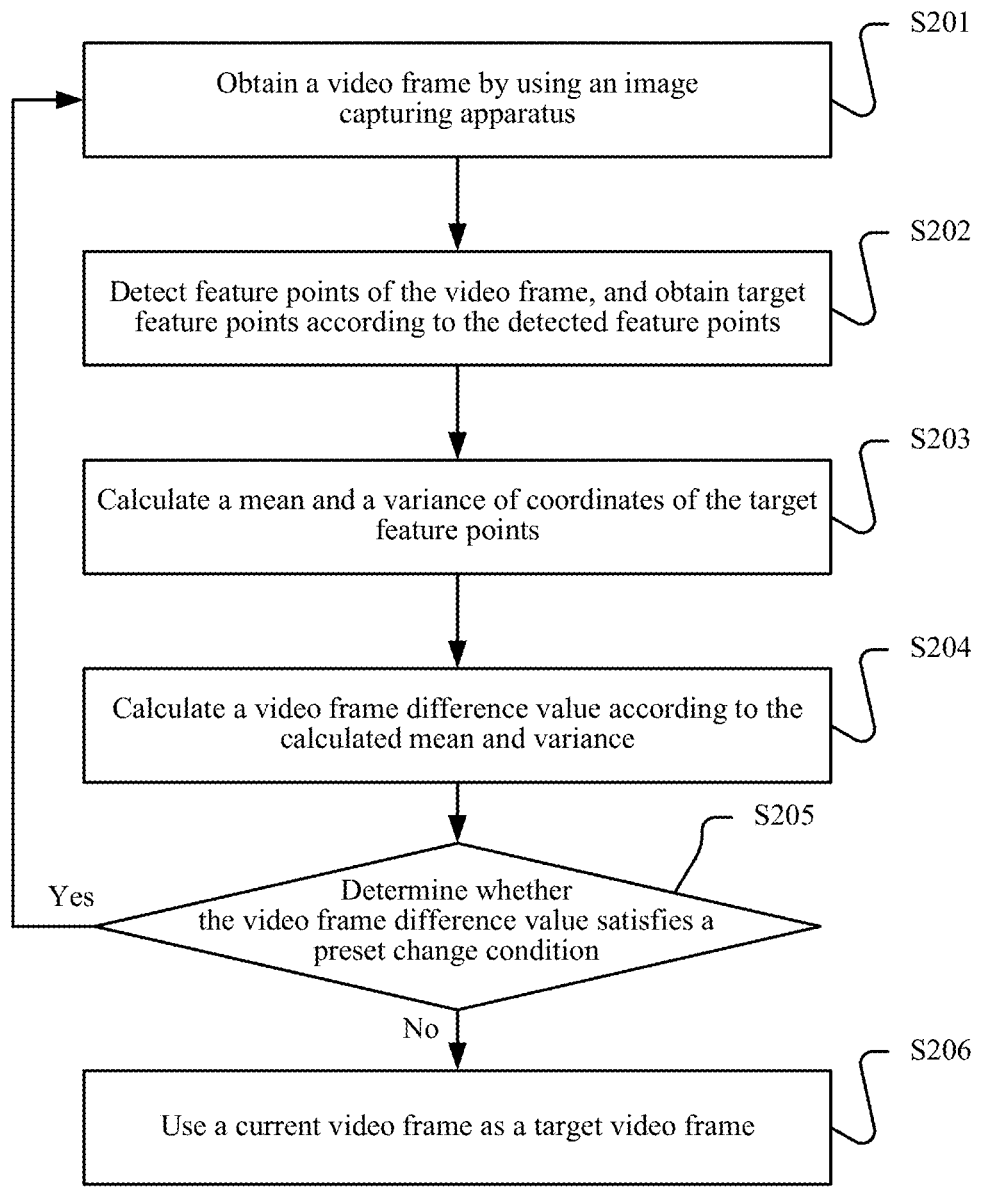
FIG. 2 is a schematic flowchart of a method for determining a video frame according to an embodiment.

FIG. 2 is a schematic flowchart of a method for determining a video frame according to an embodiment. The determined video frame is a video on which box selection and classification processing may be performed after stabilization. As FIG. 2, step S201: Obtain a video frame by using an image capturing apparatus. Step S202: Detect feature points of the video frame, and obtain target feature points according to the detected feature points. according to an embodiment, the detected feature points may be features from accelerated segment test (FAST). A plurality of the feature point may be detected, and some or all of the feature points are used as target feature points for subsequent processing. Step S203: Calculate a mean and a variance of coordinates of the target feature points, where the feature point coordinates may refer to pixel coordinates of the feature points in the image. Step S204: Calculate a video frame difference value further according to the obtained mean and variance of coordinates of the target feature points in the current video frame and according to a mean and a variance that are calculated last time. The mean and variance that are calculated last time are a mean and a variance of coordinates of all feature points in a last video frame, a video frame difference value is a difference between two means and a difference between two variances. Step S205: Determine whether the video frame difference value satisfies a preset change condition. For example, a difference between the two means and a difference between the two variances are compared with a preset threshold, and if a least one difference exceeds the threshold, the preset change condition is satisfied, and if neither of the two differences exceeds the threshold, the preset change condition is not satisfied. If the preset change condition is not satisfied, it is considered that the video is stably captured, that is, a picture of the video is stable, it may proceed to step S206. S206: Use a current video frame as a target video frame, to perform processing, such as box selection and classification, on the target video frame. If the preset change condition is satisfied, it is considered that the video is unstably captured, further the calculated mean and variance of the coordinates of the respective feature point at this time are recorded, and step S201 is jumped to, to obtain a new video frame by using the image capturing apparatus and perform subsequent processing again.

After the target video frame is determined, according to an embodiment, if box selection and classification on a video frame is locally performed on the client device, the foregoing models are directly called to box selection and classification on the target video frame, so as to obtain an augmented reality scene according to a result of the box selection and classification. According to an embodiment, if box selection and classification on a video frame is performed on the server device, the client device needs to transmit the target video frame to the server device, the server device calls the foregoing models to perform box selection and classification on the target video frame, and return a result of the box selection and classification to the client device. The client device obtains an augmented reality scene according to the result of the box selection and classification.

Figure 3:
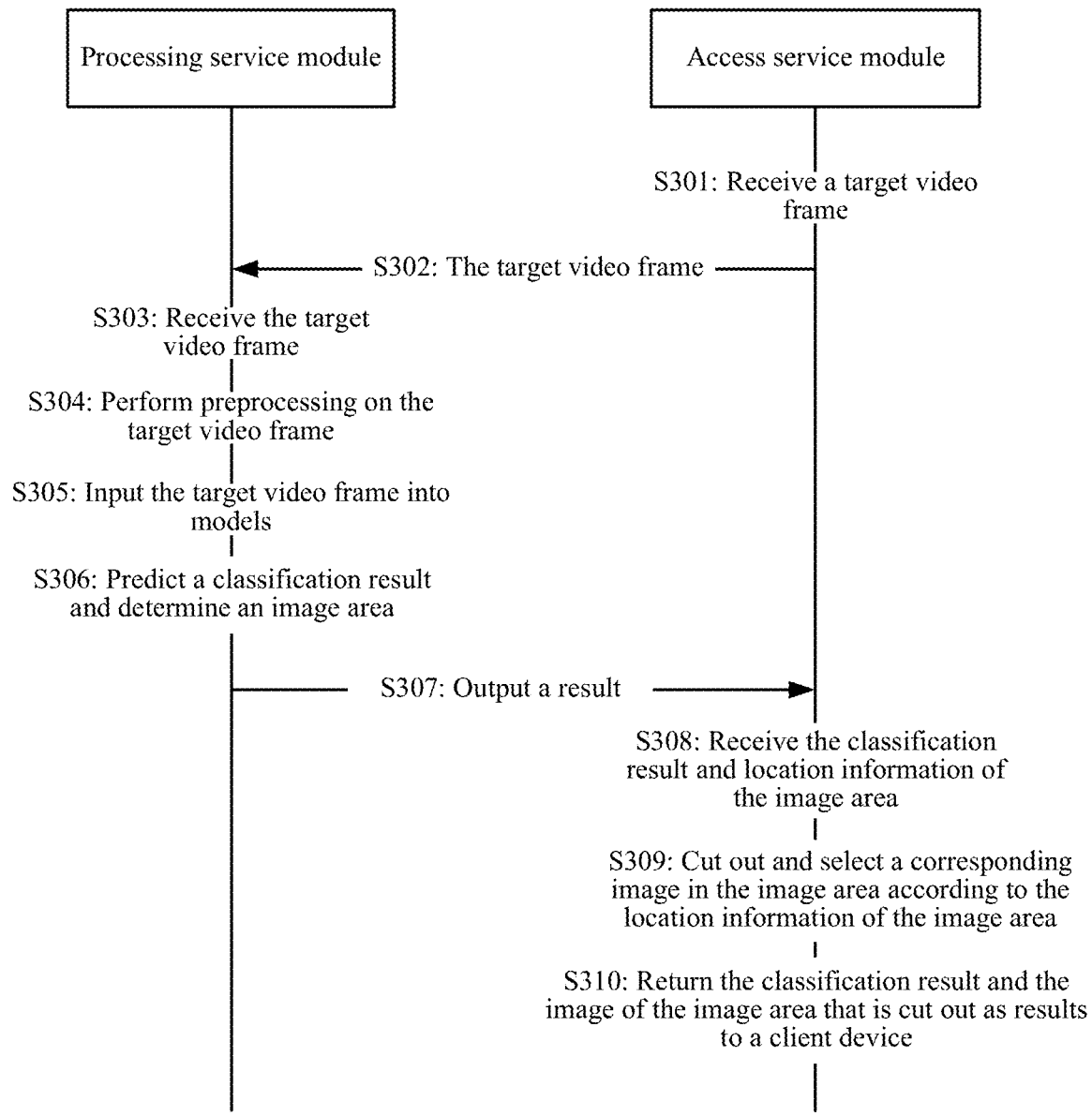
FIG. 3 is a schematic work flowchart of an inner structure of a server device according to an embodiment.
Figure 4:
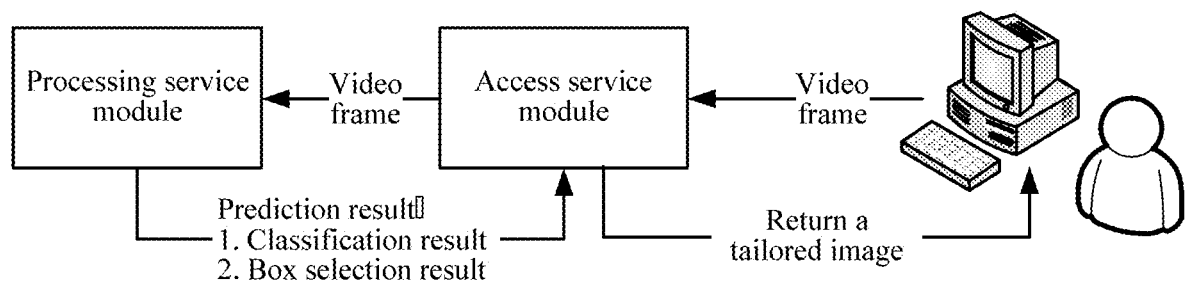
FIG. 4 is a schematic diagram of interaction between a client device and a server device according to an embodiment.
Figure 5:
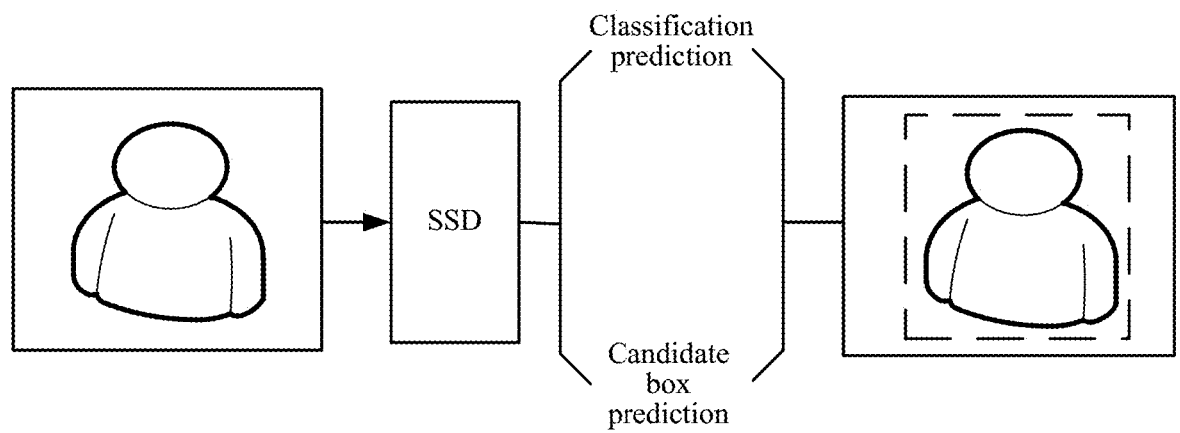
FIG. 5 is a schematic diagram of recognizing a target video frame by using an SSD model according to an embodiment.

As shown in FIG. 3, the server device may include an access service module and a processing service module. For an interaction process between the client device and the server device, refer to FIG. 4. Specifically, the client device sends a target video frame to the access service module, and the access service module may perform the following steps S301 and S302: S301: Receive a target video frame. S302: Transmit the target video frame to the processing service module. Further, the processing service module may perform steps S303 to S306. S303: Receive the target video frame. S304: Perform preprocessing on the target video frame, where the preprocessing may include processing image compression, tailoring, and the like, and a function of the preprocessing is obtaining an image suitable for box selection and classification, and processing efficiency can be improved. S305: Input the target video frame into the foregoing models, where the models may box-select an object area and perform classified recognition on an object. S306: Predict a classification result, box-select and determine an image area, and output a result, where the output result includes location information of a determined image area. According to an embodiment, refer to FIG. 5 for a schematic diagram of recognizing a target video frame by using an SSD model. Subsequently, the access service module may perform the following steps: S308 to S310: S308: Receive the classification result and location information of the image area. S309: Perform tailoring according to the location information of the image area to cut out and select a corresponding image in the image area. S310: Return the classification result and the image of the image area that is cut out and selected as results to the client device. After receiving the classification result and the image that is cut out and selected, the client device first finds, according to the classification result, AR scene information associated with a category in the classification result. According to an embodiment, AR scene information may be configured for a category in advance instead of configuring AR scene information for a specific image object, and if final classification results of different image objects are a same category, AR scene information in the same category is found. According to an embodiment, a category may be associated with a plurality of pieces of AR scene information. In this case, associated AR scene information for a category in a classification result may be determined randomly or by using another rule.

After determining the AR scene information, the client device superimposes the AR scene information onto an image that is cut out and selected, and displays the AR scene information on a screen of the client device to obtain an AR scene for a user to view. According to an embodiment, the AR scene includes information such as sound and a 3D image.

In the embodiments of this application, a model is preset, a partial image area in a video frame is determined based on a box selection model, and an object in the partial image area is further classified based on a classification mode, so as to quickly and accurately determining a category of the object on which AR scene information needs to be superimposed. Moreover, an entire image does not need to be analyzed to perform determining, and AR scene information can be superimposed for objects of a specific category, thereby quickly and conveniently generalizing AR scene information superimposition. In addition, when the AR scene information is superimposed subsequently, the partial image area determined by box selection is also further used as a reference location, to superimpose the AR scene information, so that superimposition of the AR scene information is more quick, convenient, accurate.

Figure 6:
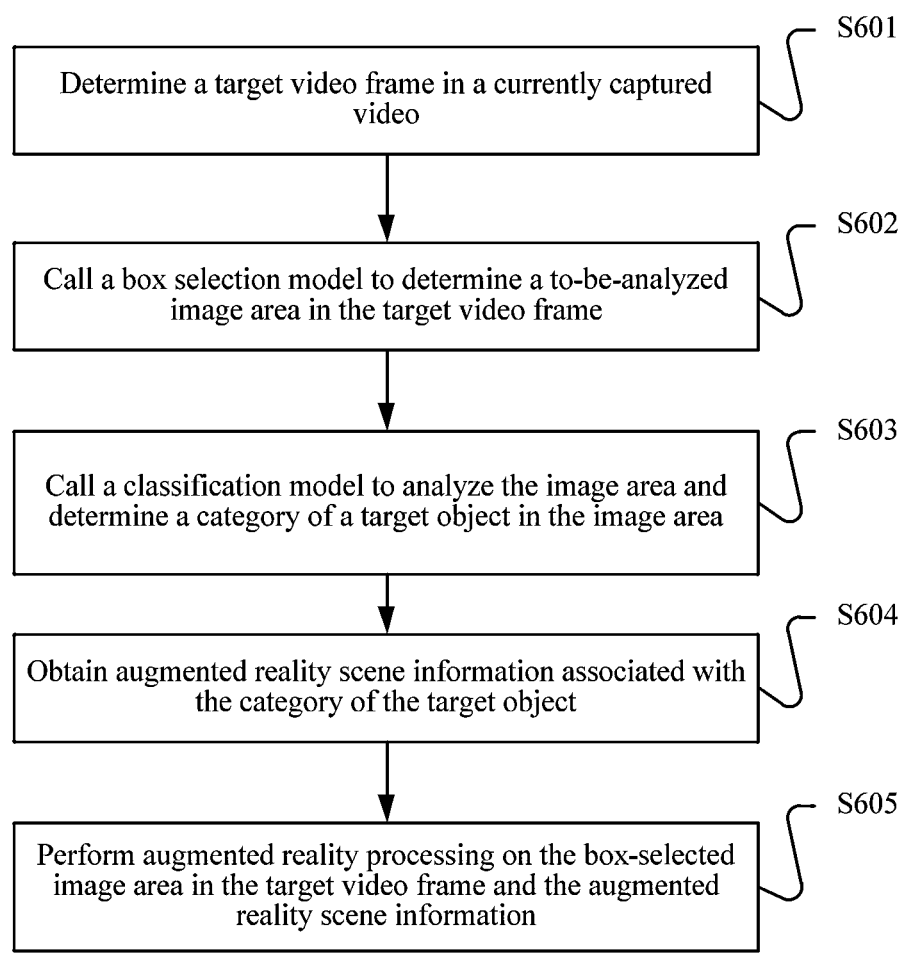
FIG. 6 is a schematic flowchart of a processing method for an augmented reality scene according to an embodiment.

FIG. 6 is a schematic flowchart of a processing method for an augmented reality scene according to an embodiment. The method may be performed by a client device. To be specific, entire AR scene-related processing may be completed by the client device. As shown in FIG. 6, the method includes steps S601 to S605 as follows.

S601: Determine a target video frame in a currently captured video.

An image capturing apparatus for capturing a video may be disposed on the client device, and the client device may implement an AR function. During an AR scene processing operation, the image capturing apparatus is invoked to capture an environment video. The target video frame includes a specific video frame after photography of the image capturing apparatus is stabilized.

The target video frame may be a video frame determined after a video picture is stabilized. After clicking to a button to enter a generalized scene, a user invokes the image capturing apparatus to start to capture a video, receives a video frame, and displays a picture of the video frame on a user interface. In this case, prompt information, such as a prompt message, is displayed on the user interface. The prompt message is used to prompt the user that a stable frame is sifted, to prompt the user to stably shoot an object, to obtain a stable video frame, and then, use the stable video frame as the target video frame.

According to an embodiment, step S601 may include the following steps: obtaining all video frames within a preset frame range in the currently captured video; determining feature points in the video frames; determining whether the video is stably captured according to pixel locations of a same feature point in the respective feature points in the respective video frames; and if yes, determining a video frame in the video frames as the target video frame.

Video frames in the preset frame range may be all video frames captured based on a current capturing time and within a time period that is distant from the current capturing time by a time length that falls within a preset time length range. The video frames in the preset frame range may only include a current video frame and a previous video frame.

Whether feature points are the same may be comprehensively determined according to pixel locations of feature points in the respective video frames, pixel values, pixel values of pixels surrounding the feature points, and the like. If a plurality of same feature points has a same location in respective video frames or an interval between pixel points is less than a preset interval value (for example, an interval of less than 3 pixels), it is considered that a video captured by the image capturing apparatus is stable, and a latest obtained video frame is used as the target video frame. If it is determined that the video is unstably photographed, for example, each same feature point in the video frames have different locations or a relatively large interval, a preset time length is waited for again, and a new video frame obtained within the preset time length is obtained. The foregoing steps of determining feature points in the respective video frame, and determining whether the video is stably captured according to pixel locations of a same feature point in the respective feature points in the respective video frames, to finally determine a target video frame are further repeated based on the new video frame.

According to an embodiment, step S601 may alternatively include the following steps: detecting all target feature points of a current video frame in the currently captured video; calculating and recording a mean and a variance of pixel coordinates of the target feature points; calculating a video frame difference value of the video according to the calculated mean and variance and according to a mean and a variance that are calculated and recorded last time; and determining the current video frame in the video as the target video frame if the video frame difference value does not satisfy a preset change condition. The previously calculated and recorded mean and variance may be a mean and a variance of target feature points in a previous video frame. The video frame difference value may include a difference between the means and a difference between the variance, and if the two differences are both not greater than a preset threshold, the preset change condition is not satisfied, it is considered that the video captured by the image capturing apparatus is stable, and the current video frame may be used as the target video frame. If at least one of the differences is greater than the preset threshold, the preset change condition is satisfied, it is considered that the captured video is unstable, the currently calculated mean and variance may be recorded, a newly captured video frame is further obtained, and then, the foregoing processing, such as detecting the target feature points in the video frame is repeated and calculating a mean and a variance, is repeated to finally determine the target video frame.

S602: Call a box selection model to determine a to-be-analyzed image area in the target video frame.

The target video frame is used as input data, an image area in the target video frame is determined by using the box selection model, and subsequently, only an object in the image area is analyzed and recognized. In addition, when augmented reality processing is performed subsequently, superimposition of AR scene information is also performed by referring to a location of the image area.

S603: Call a classification model to analyze the image area and determine a category of a target object in the image area.

A target object in the image area of the target video frame is recognized to determine a category of the target object, so as to select proper AR scene information for superimposition of the target video frame according to the category.

The box selection model and the classification model may be configured by a user in advance, configured when a corresponding device is delivered from a factory, or set by a user after downloading and install a corresponding application.

S604: Obtain augmented reality scene information associated with the category of the target object.

One or more pieces of AR scene information may be configured for each category in advance. For example, AR scene information that can be configured for a "dog" category includes: a 3D image of "dog bone", a special audio effect of a bark, and the like. After the category of the target object in the image area is determined, it only needs to search for AR scene information that is configured for the category in advance.

S605: Perform augmented reality processing on the box-selected image area in the target video frame and the augmented reality scene information, to obtain an augmented reality scene.

Augmented reality processing (that is, AR processing) includes superimposition of a 3D image, superimposition of an audio effect, and the like. The superimposition of a 3D image is superimposing a corresponding 3D image onto an image area box-selected based on the box selection model, and it no longer needs to search for a superimposition location in the target video frame. According to an embodiment, an image area determined by box selection may alternatively be cut out to form a new image, and the category of the target object is recognized and AR processing is performed only in the new image that is cut out.

After the AR processing is completed, the client device may present the processed target video frame to a user by using apparatuses such as a screen and a speaker. Then, a video frame in the newly captured video is used as the new target video frame, steps S602 to S605 are repeatedly performed to continuously obtain AR scenes and provide to the user. That is, for the first target video frame, it needs to determine whether a video picture is stable when the image capturing apparatus captures a video, and after it is determined that the video picture is stable, and a target video frame is obtained, all the subsequent video frames are used as new target video frames to perform the foregoing steps S601 to S605.

According to an embodiment, step S605 may include the following steps: tailoring the target video frame to obtain an image including the box-selected image area; performing three-dimensional superimposition on the augmented reality scene information and the image including the box-selected image area; and generating a video frame of the augmented reality scene according to an image after the three-dimensional superimposition, and displaying the video frame of the augmented reality scene. That is, for the target video frame, only a partial area image that is cut out may be tailored to perform AR scene processing. Certainly, alternatively, the image does not need to be tailored, and AR scene information may be superimposed onto the entire image. The superimposed AR scene information may be superimposed onto the image area determined by the box selection model.

The aforementioned box selection model and classification model may be implemented in a same model, or may be two different models.

In the foregoing processing method for an augmented reality scene, a partial image area in a video frame is determined based on a model, and an object in the partial image area is further classified based on a classification mode, so as to quickly and accurately determining a category of the object on which AR scene information needs to be superimposed. Moreover, it does not need to analyze an entire image to perform determining, and AR scene information can be superimposed for objects of a specific category, thereby quickly and conveniently generalizing AR scene information superimposition. In addition, when the AR scene information is superimposed subsequently, the partial image area determined based on box selection is also further used as a reference location, to superimpose the AR scene information, so that superimposition of the AR scene information is more quick, convenient, and accurate.

Figure 7:
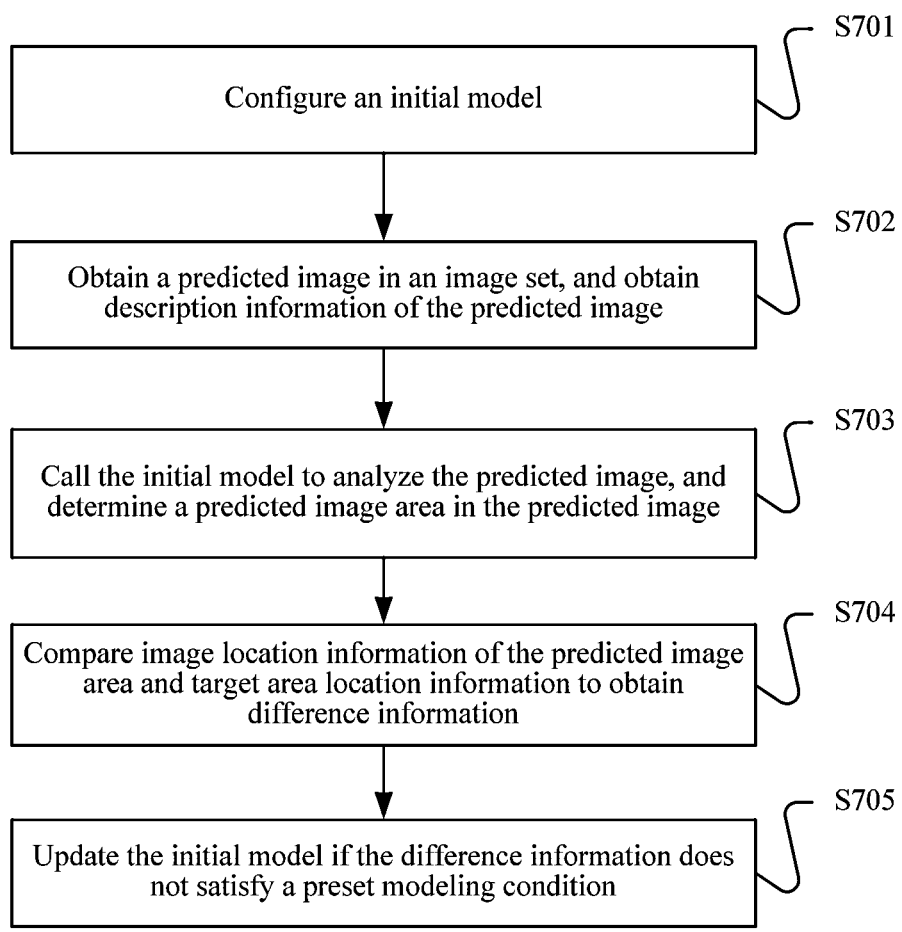
FIG. 7 is a schematic flowchart of a method for configuring a model according to an embodiment.

FIG. 7 is a schematic flowchart of a method for configuring a model according to an embodiment. The method may be used to configure the foregoing box selection model. As shown in FIG. 7, the method may include steps S701 to S705 as follows.

S701: Configure an initial model.

The configured initial model can automatically roughly box-select an image area including a target object from an image according to pixel values of pixels in the image and a box selection rule that is set by a user and that is of a box selection manner based on a rectangular box and the like. The initial model may be a constructed SSD model. A model for performing preliminary box selection on an object area may be constructed based on the SSD, and optimization is further performed to obtain a final box selection model.

S702: Obtain a predicted image in an image set, and obtain description information of the predicted image, the description information including target area location information of a target area in the predicted image.

The description information may be set by a user and may include, according to actual requirements, at least one of the following: a path of an image, a name of the image, upper left corner coordinates of a rectangular box, lower right corner coordinates of the rectangular box, and a classification identifier. The description information may be an XML file. The image set may be collected by the user through various paths, for example, in manners such as searching on the network and location shooting. Each image in the image set may be correspondingly processed as a predicted image.

The upper left corner coordinates of the rectangular box and the lower right corner coordinates of the rectangular box may be pixel coordinates that are determined by detecting a box-selected prediction box after the user manually clicks the prediction box on a user interface displaying the predicted image. The user may box-select a prediction box of an image area including the target object according to a location area of the target object in the predicted image.

According to an embodiment, step S702 may include the following steps: displaying the predicted image on a user interface; and receiving a box selection operation on the user interface, and using location information of a prediction box determined in the box selection operation as the target area location information, to obtain the description information, where the target area location information includes pixel upper left corner coordinates and pixel lower right corner coordinates of the prediction box.

S703: Call the initial model to analyze the predicted image, and determine a predicted image area in the predicted image.

Specifically, the initial model may automatically box-select the predicted image area in the predicted image.

S704: Compare image location information of the predicted image area and target area location information to obtain difference information.

The image location information of the predicted image area is an image location of the predicted image area in the predicted image. Location information of the predicted image area and target area location information in the description information set for the predicted image are calculated by using a loss function to obtain a loss value, and then the loss value is used as difference information.

S705: Update the initial model if the difference information does not satisfy a preset modeling condition.

If the difference information is the aforementioned loss value, whether the loss value is greater than a preset threshold is determined, if the loss value is greater than the preset threshold, the preset modeling condition is not satisfied, a modeling parameter in the initial model need to be adjusted, and then, the foregoing steps S703 to S705 are performed on the predicted image again until the obtained difference information satisfies the preset modeling condition. After it is determined that difference information corresponding to a current predicted image satisfies a modeling condition, steps S702 to S705 are further perfumed on a next predicted image selected from the image set until steps S702 to S705 are performed on all the images in the predicted image set, and a final model obtained by updating, by the user, the initial model for box selection a plurality of times is used as a box selection model.

Figure 8:
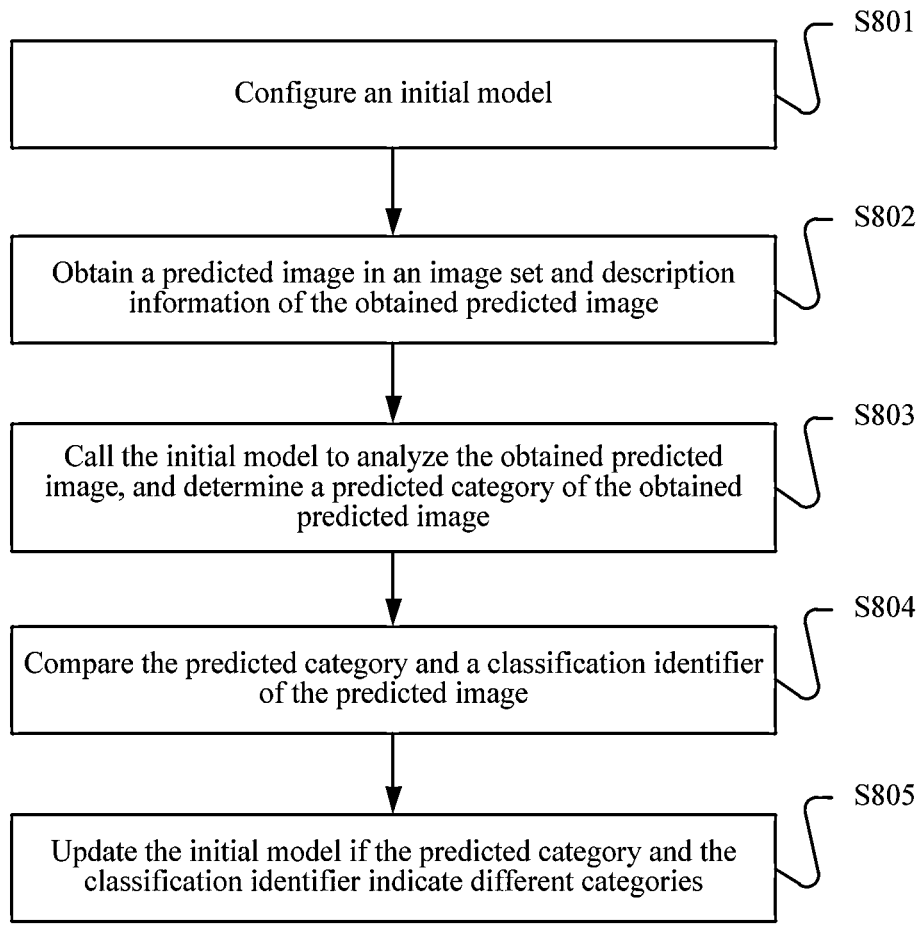
FIG. 8 is a schematic flowchart of a method for configuring a model according to an embodiment.

FIG. 8 is a schematic flowchart of a method for configuring a model according to an embodiment. The method may be used to configure the aforementioned classification model. As shown in FIG. 8, the method may include steps S801 to S805 as follows.

S801: Configure an initial model.

The configured initial model can automatically perform classified recognition on an object in an image according to parameters, such as pixel values of pixels in the image, and different types of preset reference images. The initial model may be constructed SSD model. A model for performing preliminary classification on a predicted image may be constructed based on the SSD, and optimization is further performed to obtain a final classification model for performing classified recognition on an object.

S802: Obtain a predicted image in an image set and description information of the obtained predicted image, the description information including a classification identifier of the obtained predicted image.

The description information may be set by a user and may include, according to actual requirements, at least one of the following: a path of an image, a name of the image, upper left corner coordinates of a rectangular box, lower right corner coordinates of the rectangular box, and a classification identifier. The description information may be an XML file.

S803: Call the initial model to analyze the obtained predicted image, and determine a predicted category of the obtained predicted image.

For determining a category of a predicted object included in a predicted image, according to an embodiment, a category of a predicted object the predicted image area may be determined by analyzing and recognizing an image in predicted image area of the predicted image. The predicted image area may be determined by using the foregoing initial model used to box select an area and a final model obtained by updating the initial model used to box select an area. SoftMax (a classification function) may alternatively be used to predict a generated image feature representation vector, determine a probability at which a predicted object in the predicted image area belongs to a category. For example, a probability of a specific predicted object belongs to a category of "dog" and a probability of a specific predicted object belongs to a category of "cat" may be separately predicted by using the SoftMax function, so as to use a category with a maximum probability as the predicted category.

S804: Compare the predicted category and a classification identifier of the predicted image.

Specifically, comparison may be performed to determine whether the predicted category of the object in the predicted image area is the same as the classification identifier in the description information. That is, whether the predicted category is the same as the category indicated by the classification identifier is determined.

S805: Update the initial model if the predicted category and the classification identifier indicate different categories.

Relevant parameters in the initial model are updated, and an object in the predicted image area of the predicted image is predicted again to obtain a predicted category based on the updated model, if the predicted category is different from the category indicated in the classification identifier in the description information, relevant parameters of the initial model are adjusted again, and the foregoing steps S803 to S805 are performed again on the prediction model. If the predicted category is the same as the category indicated in the classification identifier in the description information, the foregoing steps S802 to S805 are repeatedly performed on a next predicted image selected from the image set until the foregoing steps S802 to S805 are performed on all images in the predicted image set. Finally, a final model obtained by updating the initial model for classification a plurality of times is used as a classification model.

Figure 9:
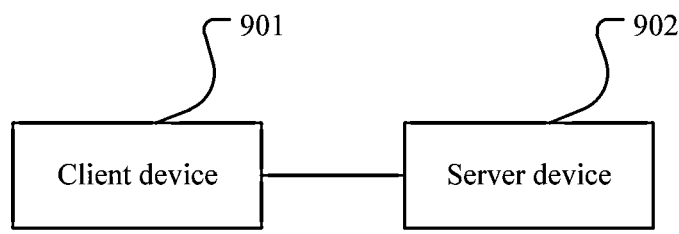
FIG. 9 is a schematic structural diagram of a system for implementing an augmented reality scene according to an embodiment.

FIG. 9 is a schematic structural diagram of a system for implementing an augmented reality scene according to an embodiment. As shown in FIG. 9, the system includes a client device 901 and a server device 902. The client device 901 may capture a video frame in a real-world environment for performing AR processing. The server device 902 may control the video frame to be processed, an image area to be box-selected, and a category of a target object in the video frame to be determined.

The client device 901 is configured to determine a target video frame in a currently captured video, and transmit the target video frame to the server device 902.

The server device 902 is configured to call a box selection model used to box-select an object area to determine a to-be-analyzed image area in the target video frame; call a classification model used to perform classified recognition on an object to analyze the image area, and determine a category of a target object in the image area; and return an image included in the image area and the category of the target object to the client device 901.

The client device 901 is configured to obtain augmented reality scene information associated with the category of the target object; and perform augmented reality processing on the box-selected image area in the target video frame and the augmented reality scene information, to obtain an augmented reality scene.

According to an embodiment, the client device 901 is configured to obtain all video frames within a preset frame range in the currently captured video; determine feature points in the video frames; determine whether the video is stably captured according to pixel locations of a same feature point in the respective feature points in the respective video frames; and if yes, determine a video frame in the video frames as the target video frame.

According to an embodiment, the client device 901 is configured to detect all target feature points of a current video frame in the currently captured video; calculate and record a mean and a variance of pixel coordinates of the target feature points; calculate a video frame difference value of the video according to the calculated mean and variance and according to a mean and a variance that are calculated and recorded last time; and determine the current video frame in the video as the target video frame if the video frame difference value does not satisfy a preset change condition.

According to an embodiment, the server device 902 is further configured to configure an initial model; obtain the predicted image in the image set, and obtain description information of the predicted image, the description information including target area location information of a target area in the predicted image; call the initial model to analyze the predicted image, and determine a predicted image area in the predicted image; and update the initial model if difference information between image location information of the predicted image area and the target area location information does not satisfy a preset modeling condition.

According to an embodiment, the server device 902 is configured to display the predicted image on a user interface; and receive a box selection operation on the user interface, and use location information of a prediction box determined in the box selection operation as the target area location information, to obtain the description information, where the target area location information includes pixel upper left corner coordinates and pixel lower right corner coordinates of the prediction box.

According to an embodiment, the server device 902 is further configured to configure an initial model; obtain the predicted image in the image set and description information of the predicted image, the description information including a classification identifier of the predicted image; call the initial model to analyze the obtained predicted image, and determine a predicted category of the obtained predicted image; and update the initial model if the predicted category and the classification identifier indicate different categories.

According to an embodiment, the client device 901 is configured to tailor the target video frame to obtain an image including the box-selected image area; perform three-dimensional superimposition on the augmented reality scene information and the image including the box-selected image area; and generate a video frame of the augmented reality scene according to an image after the three-dimensional superimposition, and display the video frame of the augmented reality scene.

For specific implementations of respective functions of the foregoing client device 901 and server device 902, refer to descriptions of relevant content in the foregoing embodiments.

In the foregoing system for implementing an augmented reality scene, a model is preset, a partial image area in a video frame is determined based on the model, and an object in the partial image area is further classified based on a classification mode, so as to quickly and accurately determining a category of the object on which AR scene information needs to be superimposed. Moreover, it does not need to analyze an entire image to perform determining, and AR scene information can be superimposed for objects of a specific category, thereby quickly and conveniently generalizing AR scene information superimposition. In addition, when the AR scene information is superimposed subsequently, the partial image area determined based on box selection is also further used as a reference location, to superimpose the AR scene information, so that superimposition of the AR scene information is more quick, convenient, accurate.

Figure 10:
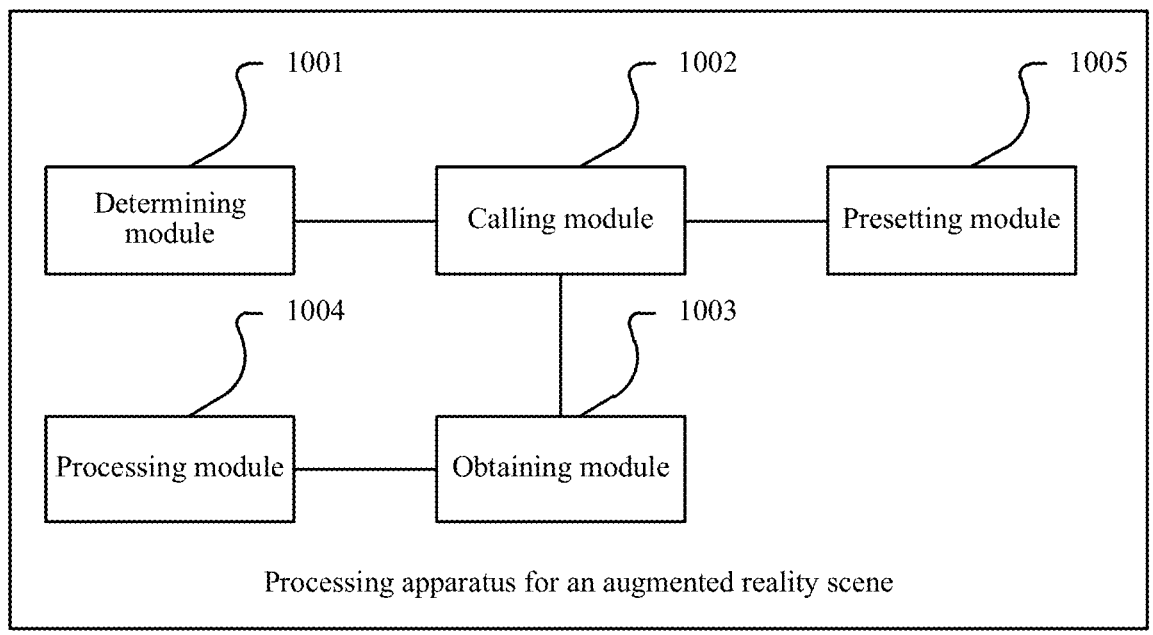
FIG. 10 is a schematic structural diagram of a processing apparatus for an augmented reality scene according to an embodiment.

FIG. 10 is a schematic structural flowchart of a processing apparatus for an augmented reality scene according to an embodiment. The apparatus may be disposed in an AR device. As shown in FIG. 10, the apparatus may include the following structures, which may be implemented using hardware such as one or more central processing units (CPUs) and one or more memory devices.

A determining module 1001 is configured to determine a target video frame in a currently captured video.

A calling module 1002 is configured to call a box selection model used to box-select an object area to determine a to-be-analyzed image area in the target video frame; and call a classification model used to perform classified recognition on an object to analyze the image area, and determine a category of a target object in the image area.

An obtaining module 1003 is configured to obtain augmented reality scene information associated with the category of the target object.

A processing module 1004 is configured to perform augmented reality processing on the box-selected image area in the target video frame and the augmented reality scene information, to obtain an augmented reality scene.

According to an embodiment, the determining module 1001 is configured to obtain all video frames within a preset frame range in the currently captured video; determine feature points in the video frames; determine whether the video is stably captured according to pixel locations of a same feature point in the respective feature points in the respective video frames; and if yes, determine a video frame in the video frames as the target video frame.

According to an embodiment, the determining module 1001 is configured to detect all target feature points of a current video frame in the currently captured video; calculate and record a mean and a variance of pixel coordinates of the target feature points; calculate a video frame difference value of the video according to the calculated mean and variance and according to a mean and a variance that are calculated and recorded last time; and determine the current video frame in the video as the target video frame if the video frame difference value does not satisfy a preset change condition.

According to an embodiment, the box selection model is obtained by training a plurality of predicted images included in an image set; and the apparatus further includes: a presetting module 1005, configured to configure an initial model; obtain the predicted image in the image set, and obtain description information of the predicted image, the description information including target area location information of a target area in the predicted image; call the initial model to analyze the predicted image, and determine a predicted image area in the predicted image; and update the initial model if difference information between location information of the predicted image area and the target area location information does not satisfy a preset modeling condition.

According to an embodiment, the presetting device 1005 is configured to display the predicted image on a user interface; and receive a box selection operation on the user interface, and use location information of a prediction box determined in the box selection operation as the target area location information, to obtain the description information, where the target area location information includes pixel upper left corner coordinates and pixel lower right corner coordinates of the prediction box.

According to an embodiment, the apparatus includes: a presetting module 1005, configured to configure an initial model; obtain the predicted image in the image set and description information of the predicted image, the description information including a classification identifier of the predicted image; call the initial model to analyze the obtained predicted image, and determine a predicted category of the obtained predicted image; and update the initial model if the determined predicted category and the classification identifier indicate different categories.

According to an embodiment, the processing module 1004 is configured to tailor the target video frame to obtain an image including the box-selected image area; perform three-dimensional superimposition on the augmented reality scene information and the image including the box-selected image area; and generate a video frame of the augmented reality scene according to an image after the three-dimensional superimposition, and display the video frame of the augmented reality scene.

For specific implementations of respective functions of the foregoing processing apparatus for an augmented reality scene, refer to descriptions of relevant content in the foregoing embodiments.

In the foregoing processing apparatus for an augmented reality scene, a model is preset, a partial image area in a video frame is determined based on the model, and an object in the partial image area is further classified based on a classification mode, so as to quickly and accurately determining a category of the object on which AR scene information needs to be superimposed. Moreover, it does not need to analyze an entire image to perform determining, and AR scene information can be superimposed for objects of a specific category, thereby quickly and conveniently generalizing AR scene information superimposition. In addition, when the AR scene information is superimposed subsequently, the partial image area determined based on box selection is also further used as a reference location, to superimpose the AR scene information, so that superimposition of the AR scene information is more quick, convenient, accurate.

Figure 11:
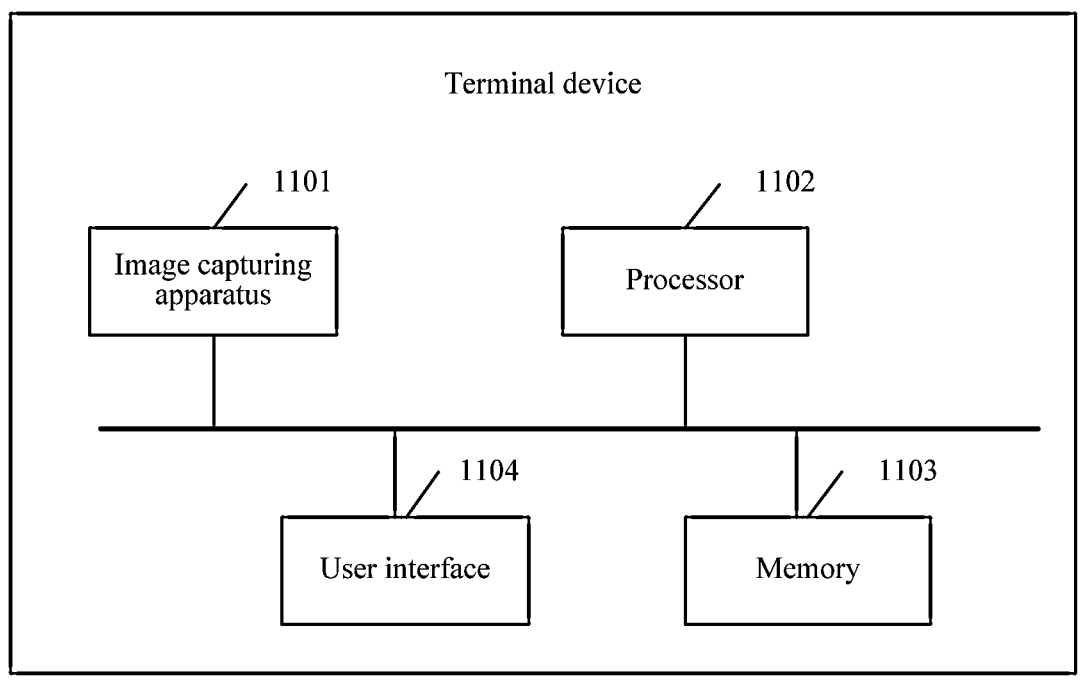
FIG. 11 is a schematic structural diagram of a terminal device according to an embodiment.

FIG. 11 is a schematic structural diagram of a terminal device according to an embodiment. The terminal device may be an AR device. As shown in FIG. 11. The AR device may include structures such as a power supply and a communications interface and may include an image capturing apparatus 1101, a processor 1102, a memory 1103, and a user interface 1104.

The memory 1103 may include a volatile memory, for example, a random access memory (RAM); the memory 1103 may alternatively include a non-volatile memory, for example, a flash memory, a hard disk drive (HDD), or a solid-state drive (SSD); and memory 1103 may alternatively include a combination of the foregoing types of memories. The processor 1102 may be a central processing unit (CPU). The user interface 1104 may include structures such as a terminal display for displaying an AR scene and a sensor for sensing a body movement of a user.

According to an embodiment, a memory 1103 is further configured to store program instructions. The processor 1102 may call the program instructions to implement the processing method for an augmented reality scene provided by the embodiments of this application.

According to an embodiment, the image capturing apparatus 1101 is configured to capture a video; the processor 1102 calls the program instructions stored in the memory 1103, and is configured to determine a target video frame in a video currently captured by the image capturing apparatus; call a box selection model used to box-select an object area to determine a to-be-analyzed image area in the target video frame; call a classification model used to perform classified recognition on an object to analyze the image area, and determine a category of a target object in the image area; obtain augmented reality scene information associated with the category of the target object; and perform augmented reality processing on the box-selected image area in the target video frame and the augmented reality scene information, to obtain an augmented reality scene.

According to an embodiment, the processor 1102 is configured to obtain, when determining a target video frame in a video currently captured, all video frames within a preset frame range in the currently captured video; determine feature points in the video frames; determine whether the video is stably captured according to pixel locations of a same feature point in the respective feature points in the respective video frames; and if yes, determine a video frame in the video frames as the target video frame.

According to an embodiment, the processor 1102 is configured to detect, when determining a target video frame in a video currently captured, all target feature points of a current video frame in the currently captured video; calculate and record a mean and a variance of pixel coordinates of the target feature points; calculate a video frame difference value of the video according to the calculated mean and variance and according to a mean and a variance that are calculated and recorded last time; and determine the current video frame in the video as the target video frame if the video frame difference value does not satisfy a preset change condition.

According to an embodiment, the box selection model is obtained by training a plurality of predicted images included in an image set; and the processor 1102 is configured to preset a box selection model, and when being configured to preset a box selection model, the processor 1102 is further configured to: configure an initial model; obtain the predicted image in the image set, and obtain description information of the predicted image, the description information including target area location information of a target area in the predicted image; call the initial model to analyze the predicted image, and determine a predicted image area in the predicted image; and update the initial model if difference information between location information of the predicted image area and the target area location information does not satisfy a preset modeling condition.

According to an embodiment, the processor 1102 is specifically configured to display, when obtaining description information of the predicted image, the predicted image on a user interface; and receive a box selection operation on the user interface, and use location information of a prediction box determined in the box selection operation as the target area location information, to obtain the description information, where the target area location information includes pixel upper left corner coordinates and pixel lower right corner coordinates of the prediction box.

According to an embodiment, the box selection model is obtained by training a plurality of predicted images included in an image set; and the processor 1102 is configured to preset a box selection model, and when being configured to preset a box selection model, the processor 1102 is further configured to: configure an initial model; obtain the predicted image in the image set and description information of the predicted image, the description information including a classification identifier of the predicted image; call the initial model to analyze the obtained predicted image, and determine a predicted category of the obtained predicted image; and update the initial model if the determined predicted category and the classification identifier indicate different categories.

According to an embodiment, the processor 1102 is specifically configured to tailor, when being configured to perform augmented reality processing on the box-selected image area in the target video frame and the augmented reality scene information, the target video frame to obtain an image including the box-selected image area; perform three-dimensional superimposition on the augmented reality scene information and the image including the box-selected image area; and generate a video frame of the augmented reality scene according to an image after the three-dimensional superimposition, and display the video frame of the augmented reality scene.

For specific implementations of the foregoing processor 1102, refer to descriptions of relevant content in the foregoing embodiments.

According to an embodiment, a computer storage medium is further provided, and the computer storage medium stores a computer program, the computer program, when executed by a processor, performing the method described in any embodiment of this application.

At least one of the components, elements, modules or units represented by a block as illustrated in FIGS. 1, 4 and 9-11 may be embodied as various numbers of hardware, software and/or firmware structures that execute respective functions described above, according to an embodiment. For example, at least one of these components, elements, modules or units may use a direct circuit structure, such as a memory, a processor, a logic circuit, a look-up table, etc. that may execute the respective functions through controls of one or more microprocessors or other control apparatuses. Also, at least one of these components, elements, modules or units may be specifically embodied by a module, a program, or a part of code, which contains one or more executable instructions for performing specified logic functions, and executed by one or more microprocessors or other control apparatuses. Also, at least one of these components, elements, modules or units may further include or may be implemented by a processor such as a central processing unit (CPU) that performs the respective functions, a microprocessor, or the like. Two or more of these components, elements, modules or units may be combined into one single component, element, module or unit which performs all operations or functions of the combined two or more components, elements, modules or units. Also, at least part of functions of at least one of these components, elements, modules or units may be performed by another of these components, elements, modules or units. Further, communication between the components, elements, modules or units may be performed through a bus. Functional aspects of the above embodiments may be implemented in algorithms that execute on one or more processors. Furthermore, the components, elements, modules or units represented by a block or processing steps may employ any number of related art techniques for electronics configuration, signal processing and/or control, data processing and the like.

The foregoing descriptions are merely some embodiments of this application, and certainly, are not intended to limit the claims of this application. A person of ordinary skill in the art may understand all or some procedures of the foregoing embodiments, and equivalent modifications made according to the claims of the present invention shall still fall within the scope of the present disclosure.

What is claimed is:

1. A processing method, performed by at least one processor, for an augmented reality scene, the processing method comprising:
    detecting, by the at least one processor, target feature points of a current video frame in a currently captured video;
    calculating, by the at least one processor, a video frame difference value according pixel coordinates of the target feature points of the current video frame and pixel coordinates of target feature points of a previous video frame;
    determining, by the at least one processor, the current video frame as a target video frame in the currently captured video based on the video frame difference value not satisfying a preset change condition;
    determining, by the at least one processor, an object area in the target video frame; and
    performing, by the at least one processor, augmented reality processing on the object area in the target video frame and augmented reality scene information, to obtain the augmented reality scene,
    wherein the calculating the video frame difference value comprises calculating, by the at least one processor, the video frame difference value based on:
        a first difference between a current mean of the pixel coordinates of the target feature points of the current video frame and a previous mean of the pixel coordinates of the target feature points of the previous video frame; and
        a second difference between a current variance of the pixel coordinates of the target feature points of the current video frame and a previous variance of the pixel coordinates of the target feature points of the previous video frame, and
    wherein the processing method further comprises determining, by the at least one processor, whether the video frame difference value satisfies the preset change condition by comparing each of the first difference and the second difference with a preset threshold.

2. The processing method according to claim 1, wherein the determining the target video frame in the currently captured video comprises:
    obtaining, by the at least one processor, all video frames within a preset frame range in the currently captured video;
    determining, by the at least one processor, feature points in the video frames;
    determining, by the at least one processor, whether the video is stable according to pixel locations of a corresponding feature point in the respective video frames; and
    based on the video being determined to be stable, determining, by the at least one processor, the target video frame from among the video frames.

3. The processing method according to claim 1, wherein the object area is determined by the at least one processor using a box selection model obtained by training based on an image set, and
    wherein the processing method further comprises:
    configuring, by the at least one processor, an initial model;
    obtaining, by the at least one processor, a predicted image in the image set and description information of the predicted image, the description information comprising target area location information of a target area in the predicted image;
    analyzing, by the at least one processor, the predicted image using the initial model and determining a predicted image area in the predicted image; and
    updating the initial model based on difference information between image location information of the predicted image area and the target area location information not satisfying a preset modeling condition.

4. The processing method according to claim 3, wherein the obtaining the description information of the predicted image comprises:
    displaying, by the at least one processor, the predicted image on a user interface;
    receiving, by the at least one processor, a box selection operation on the user interface; and
    obtaining, by the at least one processor, the description information based on location information of a prediction box selected in the box selection operation as the target area location information, and
    wherein the target area location information comprises pixel upper left corner coordinates and pixel lower right corner coordinates of the prediction box.

5. The processing method according to claim 1, further comprising determining, by the at least one processor, a category of a target object in the object area based on a classification model used to classify an object in the object area,
    wherein the classification model is obtained by training based on an image set and the processing method further comprises:
    configuring, by the at least one processor, an initial model;
    obtaining, by the at least one processor, a predicted image in the image set and description information of the predicted image, the description information comprising a classification identifier of the predicted image;
    analyzing, by the at least one processor, the predicted image using the initial model to obtain a predicted category of the predicted image; and
    updating the initial model based on the predicted category of the predicted image being different from a category indicated by the classification identifier.

6. The processing method according to claim 1, wherein the performing the augmented reality processing on the object area in the target video frame and the augmented reality scene information comprises:
    tailoring, by the at least one processor, the target video frame to obtain a tailored image comprising the object area;
    performing, by the at least one processor, three-dimensional superimposition on the augmented reality scene information and the tailored image;
    generating, by the at least one processor, a video frame of the augmented reality scene according to a subsequent image that is captured after the three-dimensional superimposition; and
    displaying, by the at least one processor, the video frame of the augmented reality scene.

7. The processing method according to claim 1, wherein the processing the augmented reality processing comprises:
    calculating, by the at least one processor, an attitude matrix according to a mapping relationship between a location of a feature point in the current video frame and a location of a corresponding feature point in a prestored image of a marker; and
    superimposing, by the at least one processor, AR scene information on the object area in the target video frame based on the attitude matrix.

8. A system for implementing an augmented reality scene, the system comprising:
    at least one memory configured to store computer program code; and
    at least one processor configured to access the at least one memory and operate as instructed by the computer program code, the computer program code including:
        target video frame determining code configured to cause the at least one processor to detect target feature points of a current video frame in a currently captured video; calculate a video frame difference value according to pixel coordinates of the target feature points of the current video frame and pixel coordinates of target feature points of a previous video frame; and determine the current video frame as a target video frame in the currently captured video based on the video frame difference value not satisfying a preset change condition;
        object area determining code configured to cause the at least one processor to determine an object area in the target video frame;
        augmented reality processing code configured to cause the at least one processor to perform augmented reality processing on the object area in the target video frame based on augmented reality scene information, to obtain the augmented reality scene,
    wherein the target video frame determining code is further configured to cause the at least one processor to calculate the video frame difference value based on:
        a first difference between a current mean of the pixel coordinates of the target feature points of the current video frame and a previous mean of the pixel coordinates of the target feature points of the previous video frame; and
        a second difference between a current variance of the pixel coordinates of the target feature points of the current video frame and a previous variance of the pixel coordinates of the target feature points of the previous video frame, and wherein the computer program code further includes determining code configured to cause the at least one processor to determine whether the video frame difference value satisfies the preset change condition by comparing each of the first difference and the second difference with a preset threshold.

9. The system according to claim 8, wherein the target video frame determining code is further configured to cause the at least one processor to:
   obtain all video frames within a preset frame range in the currently captured video;
   determine feature points in the video frames;
   determine whether the video is stable according to pixel locations of a corresponding feature point in the respective video frames; and
   based on the video being determined as stable, determining the target video frame from among the video frames.

10. The system according to claim 8, wherein the object area is determined using a box selection model obtained by training based on an image set, and
   wherein the computer program code further includes:
   configuration code configured to cause the at least one processor to configure an initial model;
   obtaining code configured to cause the at least one processor to obtain a predicted image in the image set and description information of the predicted image, the description information comprising target area location information of a target area in the predicted image;
   analyzing code configured to cause the at least one processor to analyze the predicted image using the initial model and determine a predicted image area in the predicted image; and
   updating code configured to cause the at least one processor to update the initial model based on difference information between image location information of the predicted image area and the target area location information not satisfying a preset modeling condition.

11. The system according to claim 10, wherein the obtaining code is further configured to cause the at least one processor to:
   display the predicted image on a user interface;
   receive a box selection operation on the user interface; and
   obtain the description information based on location information of a prediction box selected in the box selection operation as the target area location information,
   wherein the target area location information comprises pixel upper left corner coordinates and pixel lower right corner coordinates of the prediction box.

12. The system according to claim 8, wherein the computer program code further includes:
   category determining code configured to cause the at least one processor to determine, based on a classification model, a category of a target object in the object area, the classification model being obtained by training based on an image set;
   configuration code configured to cause the at least one processor to configure an initial model;
   obtaining code configured to cause the at least one processor to obtain a predicted image in the image set and description information of the predicted image, the description information comprising a classification identifier of the predicted image;
   analyzing code configured to cause the at least one processor to analyze the predicted image using the initial model and obtain a predicted category of the predicted image; and
   updating code configured to cause the at least one processor to update the initial model based on the predicted category of the predicted image being different from a category indicated by the classification identifier.

13. The system according to claim 8, wherein the augmented reality processing code is further configured to cause the at least one processor to:
   tailor the target video frame to obtain a tailored image comprising the object area;
   perform three-dimensional superimposition on the augmented reality scene information and the tailored image;
   generate a video frame of the augmented reality scene according to a subsequent image that is captured after the three-dimensional superimposition; and
   display the video frame of the augmented reality scene.

14. The system according to claim 8, wherein the augmented reality processing code is further configured to cause the at least one processor to:
   calculate an attitude matrix according to a mapping relationship between a location of a feature point in the current video frame and a location of a corresponding feature point in a prestored image of a marker; and
   superimpose AR scene information on the object area in the target video frame based on the attitude matrix.

15. One or more non-transitory computer storage mediums storing computer readable instructions, the computer readable instructions, when executed by one or more processors, causing the one or more processors to:
   detect target feature points of a current video frame in a currently captured video;
   calculate a video frame difference value according to pixel coordinates of the target feature points of the current video frame and pixel coordinates of target feature points of a previous video frame;
   determine the current video frame as a target video frame in the currently captured video based on the video frame difference value not satisfying a preset change condition;
   determine an object area in the target video frame; and
   perform augmented reality processing on the object area in the target video frame and augmented reality scene information, to obtain an augmented reality scene,
   wherein the computer readable instructions further cause the one or more processors to calculate the video frame difference value based on:
   a first difference between a current mean of the pixel coordinates of the target feature points of the current video frame and a previous mean of the pixel coordinates of the target feature points of the previous video frame; and
   a second difference between a current variance of the pixel coordinates of the target feature points of the current video frame and a previous variance of the pixel coordinates of the target feature points of the previous video frame, and
   wherein the computer readable instructions further cause the one or more processors to determine whether the video frame difference value satisfies the preset change condition by comparing each of the first difference and the second difference with a preset threshold.

16. The one or more non-transitory computer storage mediums according to claim 15, wherein the computer readable instructions further cause the one or more processors to determine the target video frame in the currently captured video by:
- obtaining all video frames within a preset frame range in the currently captured video;
- determining feature points in the video frames;
- determining whether the video is stable according to pixel locations of a corresponding feature point in in the respective video frames; and
- based on the video being determined to be stable, determining the target video frame from among the video frames.

17. The one or more non-transitory computer storage mediums according to claim 15, wherein the object area is determined using a box selection model obtained by training based on an image set, and
wherein the computer readable instructions further cause the one or more processors to:
- configure an initial model;
- obtain a predicted image in the image set and description information of the predicted image, the description information comprising target area location information of a target area in the predicted image;
- analyze the predicted image using the initial model and determine a predicted image area in the predicted image; and
- update the initial model based on difference information between image location information of the predicted image area and the target area location information not satisfying a preset modeling condition.

18. The one or more non-transitory computer storage mediums according to claim 17, wherein the computer readable instructions further cause the one or more processors to obtain the description information of the predicted image by:
- displaying the predicted image on a user interface;
- receiving a box selection operation on the user interface; and
- obtaining the description information based on location information of a prediction box selected in the box selection operation as the target area location information,
wherein the target area location information comprises pixel upper left corner coordinates and pixel lower right corner coordinates of the prediction box.

19. The one or more non-transitory computer storage mediums according to claim 15, wherein the computer readable instructions further cause the one or more processors to:
- determine, based on a classification model, a category of a target object in the object area, the classification model being obtained based on an image set;
- configure an initial model;
- obtain a predicted image in the image set and description information of the predicted image, the description information comprising a classification identifier of the predicted image;
- analyze the predicted image using the initial model to obtain a predicted category of the predicted image; and
- update the initial model based on the predicted category of the predicted image being different from a category indicated by the classification identifier.

20. The one or more non-transitory computer storage mediums according to claim 15, wherein the computer readable instructions further cause the one or more processors to perform the augmented reality processing by:
- calculating an attitude matrix according to a mapping relationship between a location of a feature point in the current video frame and a location of a corresponding feature point in a prestored image of a marker; and
- superimposing AR scene information on the object area in the target video frame based on the attitude matrix.

* * * * *